(12) United States Patent  
Lyerly

(10) Patent No.: US 7,913,063 B1
(45) Date of Patent: Mar. 22, 2011

(54) SYSTEM AND METHOD FOR PERFORMANCE BASED CALL DISTRIBUTION

(75) Inventor: Thomas Lyerly, Marietta, GA (US)

(73) Assignee: Verint Americas Inc., Melville, NY (US)

( * ) Notice: Subject to any disclaimer, the term of this patent is extended or adjusted under 35 U.S.C. 154(b) by 329 days.

(21) Appl. No.: 12/132,259

(22) Filed: Jun. 3, 2008

Related U.S. Application Data

(60) Provisional application No. 61/049,923, filed on May 2, 2008.

(51) Int. Cl.
*G06F 15/76* (2006.01)
*H04M 3/523* (2006.01)

(52) U.S. Cl. ..................... 712/30; 379/265.12
(58) Field of Classification Search .................. 712/30; 379/265.12
See application file for complete search history.

(56) References Cited

U.S. PATENT DOCUMENTS

| | | | | |
|---|---|---|---|---|
| 5,825,869 A * | 10/1998 | Brooks et al. | ............ | 379/265.12 |
| 5,946,375 A * | 8/1999 | Pattison et al. | .......... | 379/112.01 |
| 6,259,786 B1 | 7/2001 | Gisby | | |
| 6,775,377 B2 * | 8/2004 | McIllwaine et al. | ...... | 379/265.06 |
| 2005/0091071 A1* | 4/2005 | Lee | .................................. | 705/1 |
| 2006/0179064 A1* | 8/2006 | Paz et al. | ......................... | 707/10 |

* cited by examiner

*Primary Examiner* — Daniel Pan

(57) ABSTRACT

A first performance indicator associated with a first agent is received from a workforce management system. A second performance indicator associated with a second agent is also received from the workforce management system. The first agent and the second agent are ranked in a queue of available agents based upon at least the first performance indicator and the second performance indicator. This produces a first queue rank associated with the first agent. An incoming call directed to the queue of available agents is received. An agent to service the incoming call is selected from the queue of available agents based upon the first queue rank.

20 Claims, 5 Drawing Sheets

SYSTEM AND METHOD FOR PERFORMANCE BASED CALL DISTRIBUTION

RELATED APPLICATIONS

This application hereby claims the benefit of and priority to U.S. Provisional Patent Application No. 61/049,923, titled "SYSTEM AND METHOD FOR PERFORMANCE BASED CALL DISTRIBUTION", filed on May 2, 2008, and which is hereby incorporated by reference in its entirety.

TECHNICAL FIELD

This invention is related to computer telephony integration (CTI). In particular, this invention is related to the distribution of calls to agents in a call center.

TECHNICAL BACKGROUND

Many businesses use call-handling or call-distributing systems as part of a call center. These call centers provide part of their customer interaction. For example, a utility company may use a call-handling system to receive service requests. A mail order catalog firm may use a call-handling system to take orders. A medical office may use a call-handling system to make appointments. Computer hardware and software firms may use a call-handling system to provide customer support.

When an incoming call is received at a call center, an automatic call distributor (ACD) routes the call to an available agent. This is typically done on a first in first out basis. In other words, the agent who has been free the longest time is assigned to service the next incoming call. The agent is then connected to the caller so that the agent may assist the caller.

TECHNICAL SUMMARY

A method of assigning calls to agents is disclosed. A first performance indicator associated with a first agent is received from a workforce management system. A second performance indicator associated with a second agent is also received from the workforce management system. The first agent and the second agent are ranked in a queue of available agents based upon at least the first performance indicator and the second performance indicator. This produces a first queue rank associated with the first agent. An incoming call directed to the queue of available agents is received. An agent to service the incoming call is selected from the queue of available agents based upon the first queue rank.

A call distribution system is disclosed. A workforce management system interface receives a first performance indicator associated with a first agent and a second performance indicator associated with a second agent. An agent priority list ranks the first agent and the second agent based upon at least the first performance indicator and the second performance indicator. This produces an agent priority associated with the first agent. A call distributor selects the first agent from the agent priority list to service an incoming call based on the agent priority associated with the first agent.

The first performance indicator and the second performance indicator may be based on quality monitoring evaluation scores. The first performance indicator and the second performance indicator may be based on customer feedback surveys. The first performance indicator and the second performance indicator may be based on lesson assessments. The first performance indicator and the second performance indicator may be based on weighted sums comprising at least two of a quality monitoring evaluation score, a customer survey feedback score, and a lesson assessment score. The first queue rank may also be based on a first idle time of the first agent and a second idle time of the second agent. The first performance indicator and the second performance indicator may be based on weighted sums comprising at least two of a quality monitoring evaluation score, a customer survey feedback score, a lesson assessment score, and an idle time score.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
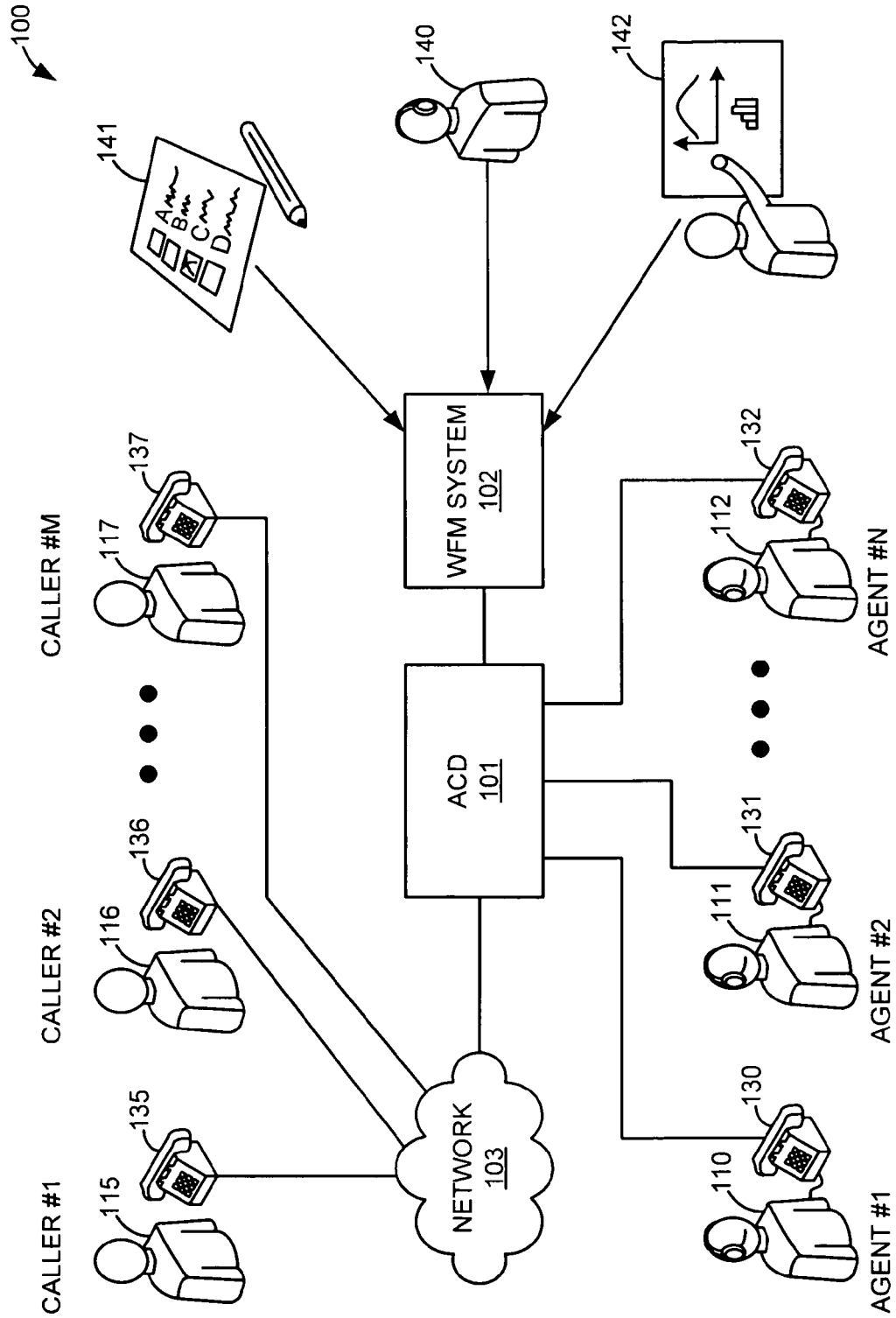
FIG. 1 is a block diagram illustrating a call distributing system.

FIG. 1 is a block diagram illustrating a call distributing system. Call distributing system 100 comprises: ACD 101; workforce management (WFM) system 102; network 103; agents 110-112; agent telephones 130-132; callers 115-117; caller telephones 135-137; quality monitoring evaluation 140; customer feedback survey 141; and, lesson assessment 142.

Callers 115-117 use caller telephones 135-137, respectively, to place calls via network 103. Network 103 operatively links caller telephones 135-137 to ACD 101. ACD 101 assigns incoming calls to agent telephones 130-132. Agents 110-112 use agent telephones 130-132, respectively, to service these incoming calls. Thus, agents 110-112 may use voice communication exchanged via caller telephones 135-137 through network 103 and agent telephones 130-132 to assist callers 115-117.

Caller telephones 135-137 an agent telephones 130-132 may be any device, system, combination of devices, or other such communication platform capable of communicating audio via network 103. Any of caller telephones 135-137 or agent telephones 130-132 may be, for example, an expanded function telephone, a mobile phone, a wireless phone, a wireless modem, a personal digital assistant (PDA), a computer system with a sound input, output, and an internet connection, a computer with a public switched telephone network (PSTN) connection, a computer with a network card, an access terminal, a voice over internet protocol (VoIP) phone, a voice over packet (VOP) phone, or a soft phone, as well as other types of devices or systems that can exchange audio via network 103.

Network 103 may be any network or collection of networks that couple, link, or otherwise operatively link caller telephones 135-137 with agent telephones 130-132. In addition, other secondary data networks could be used. In an example, network 103 may include a backhaul network, a local network, a long distance network, a packet network, or any combination thereof, as well as other types of networks.

ACD 101 may be a system or collection of systems or software that link or otherwise assign incoming calls from caller telephones 135-137 to agent telephones 130-132. ACD 101 may be, or include, but is not limited to, CTI technologies and applications such as intelligent private branch exchanges (PBXs), computerized ACD systems, call servers, fax servers, interactive voice response (IVR) systems, voice mail, messaging systems, and so on.

WFM system 102 may perform many functions. One such function is providing a call center supervisor or manager with information about agents 110-112. This information may be historical or real-time. Another function of WFM system 102 is supplying the supervisor with information on how well each agent 110-112 complies with customer center policies. This information may be based on one or more of quality monitoring evaluation 140, customer feedback survey 141, and, lesson assessment 142. Yet another function is calculating staffing levels and creating agent schedules based on historical patterns of incoming calls. The functionality of WFM system 102 is typically divided among several applications. Some of these applications have a user interface component. WFM system 102 comprises a suite of applications.

Taken together, agents 110-112, agent telephones 130-132, ACD 101, WFM system 102, quality monitoring evaluation 140, customer feedback survey 141, and, lesson assessment 142 comprise a call center. A call center may include, but is not limited to, outsourced customer centers, outsourced customer relationship management, customer relationship management, voice of the customer, customer interaction, customer center, multi-media customer center, remote office, distributed enterprise, work-at-home agents, remote agents, branch office, back office, performance optimization, workforce optimization, hosted customer centers, and speech analytics.

In an embodiment, WFM system 102 may include one or more of a performance manager, an evaluation manager, and a development manager. The evaluation manager allows various types of agent 110-112 review processes to be managed (i.e. 360 degree reviews). The evaluation manager may receive or generate information about agents 110-112 based on a variety of data sources including data from quality monitoring evaluation 140, customer feedback survey 141, and, lesson assessment 142.

The performance manager receives data from the evaluation manager. The performance manager presents the performance data to the call center manager through various scorecard views. The development manager tracks agent learning/development and detects the need for training. The development manager may generate or receive information about agents 110-112 based on a variety of data sources including quality monitoring evaluation 140, customer feedback survey 141, and, lesson assessment 142.

Quality monitoring evaluation 140 may use speech analytics (i.e., the analysis of recorded or real-time speech) or a human listener to perform a variety of functions. These functions may include automated call evaluation, call scoring, quality monitoring, quality assessment and compliance/adherence. For example, quality monitoring evaluation 140 may compare a recorded interaction between one of agent 110-112 and one of caller 115-117 to a script (e.g., a script that the agent 110-112 was to use during the interaction). In other words, quality monitoring evaluation 140 may measure how well agents 110-112 adhere to scripts. This allows the agents 110-112 to be identified that are "good" sales people and which ones may need additional training. As such, quality monitoring evaluation 140 may find agents 110-112 that do not adhere to scripts.

In another example, quality monitoring evaluation 140 may determine compliance with various policies. This may be important, for example, in a highly regulated business where agents 110-112 must abide by many rules. The collections industry is an example of such a business.

Also included in this disclosure are embodiments of WFM system 102 included in U.S. patent application Ser. No. 11/359,356, filed on Feb. 22, 2006, titled "Systems and Methods for Workforce Optimization," and U.S. patent application Ser. No. 11/540,185, filed on Sep. 29, 2006, titled "Systems and Methods for Facilitating Contact Center Coaching," both of which are hereby incorporated herein by reference in their entireties.

At least one embodiment of WFM system 102 may include: (1) quality monitoring/call Recording—voice of the customer; the complete customer experience across multimedia touch points; (2) workforce management—strategic forecasting and scheduling that drives efficiency and adherence, aids in planning, and helps facilitate optimum staffing and service levels; (3) performance management—key performance indicators (Kips) and scorecards that analyze and help identify synergies, opportunities and improvement areas; (4) e-learning—training, new information and protocol disseminated to staff, leveraging best practice customer interactions and delivering learning to support development; (5) analytics—deliver insights from customer interaction to drive business performance; and/or (6) coaching—feedback to promote efficient performance. One or more of quality monitoring evaluation 140, customer feedback survey 141, and, lesson assessment 142 may provide information used by one or more of these parts of WFM system 102. In addition, WFM system 102 may generate information used internally by one or more parts of WFM system 102.

WFM system 102 provides ACD 101 with at least one performance indicator each for agents 110-112. In other words, WFM system 102 provides a performance indicator (or multiple performance indicators) to ACD 101 associated with agent 110. WFM system 102 also provides a performance indicator (or multiple performance indicators) to ACD 101 associated with agent 111, and so on. These performance indicators may include or be based on Kips, skills assessments, training, and so on that are based on one or more of a quality monitoring evaluation 140, customer feedback survey 141, and, lesson assessment 142. ACD may receive these performance indicators via a workforce management system interface.

ACD 101 ranks agents 110-112 in a queue or agent priority list of available agents based on their associated performance indicator. In other words, if agent 110 had a higher performance indicator (indicating, for example, a better proficiency at something) than agent 111, then agent 110 would be ranked higher than agent 111 in the queue of available agents Likewise, if agent 111 had a higher performance indicator than agent 112, then agent 111 would be ranked higher than agent 112, and so on.

In an embodiment, the performance indicator that ACD 101 uses to rank agents 110-112 is based on at least quality monitoring evaluation 140. In another embodiment, the performance indicator that ACD 101 uses to rank agents 110-112 is based on at least customer feedback survey 141. In another embodiment, the performance indicator that ACD 101 uses to rank agents 110-112 is based on at least lesson assessment 142. These performance indicators may take the form of one or more scores.

In another embodiment, ACD 101 ranks agents 110-112 based on a weighted sum comprised of at least two of quality monitoring evaluation 140, customer feedback survey 141, and, lesson assessment 142. To illustrate, consider a case where: (a) a performance indicator score that is based on quality monitoring evaluation 140 is A; (b) a performance indicator score that is based on customer feedback survey 141 is B; and, (c) a performance indicator score that is based on lesson assessment 142 is C. In this case, ACD 101 may rank agents 110-112 based on weighted sum (P). P may be calculated, for example, as: $P=(W*A)+(X*B)+(Y*C)$ where W, X, and Y, are weighting factors. The weighting factors W, X, and Y, are chosen to generate a desirable ranking of agents 110-112.

In another embodiment ACD 101 ranks agents 110-112 based on the idle times of agents 110-112. For example, ACD 101 may rank agents 110-112 based on a weighted sum that includes the idle times of agents 110. To illustrate, consider a case where: (a) a performance indicator score that is based on quality monitoring evaluation 140 is A; (b) a performance indicator score that is based on customer feedback survey 141 is B; (c) a performance indicator score that is based on lesson assessment 142 is C; (d) an idle time for an agent 110-112 is D. In this case, ACD 101 may rank agents 110-112 based on weighted sum (P). P may be calculated, for example, as: $P=(W*A)+(X*B)+(Y*C)+(Z*D)$ where W, X, Y, and Z are weighting factors. The weighting factors W, X, Y, and Z are chosen to generate a desirable ranking of agents 110-112.

The order of this ranking in the queue or agent priority list determines which agent 110-112 will be selected by ACD 101 to service the next incoming call from one of callers 115-117. In other words, the agent 110-112 that is selected to service an incoming call is selected by ACD 101 based upon their ranking in the queue.

Figure 2:
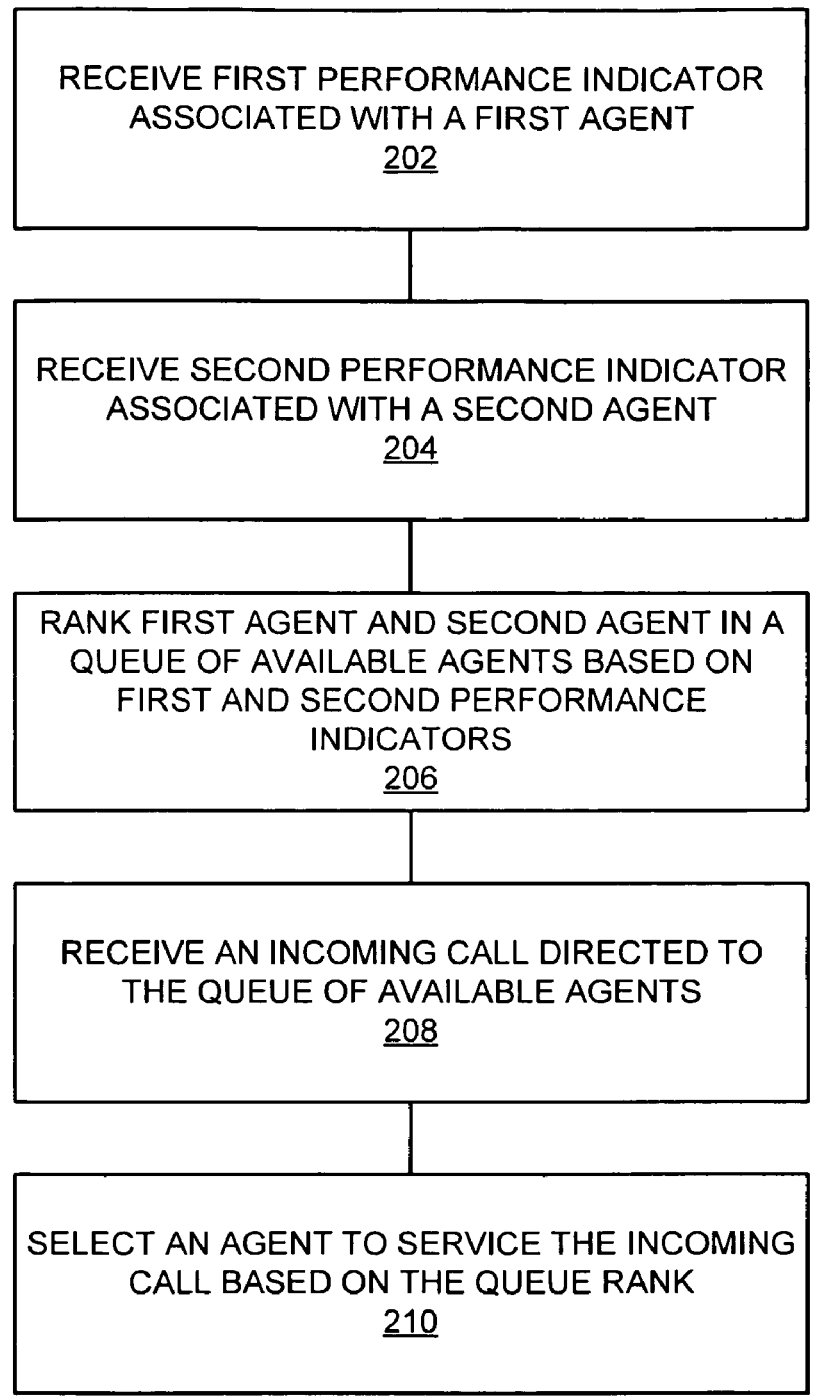
FIG. 2 is a flowchart illustrating a method of assigning calls to agents.

FIG. 2 is a flowchart illustrating a method of assigning calls to agents. The steps illustrated in FIG. 2 may be performed by one or more elements of call distributing system 100.

A first performance indicator associated with a first agent is received (202). For example, ACD 101 may receive a performance indicator from WFM system 102 that is associated with agent 110. This performance indicator may be based on one or more of a quality monitoring evaluation 140, customer feedback survey 141, and lesson assessment 142.

A second performance indicator associated with a second agent is received (204). For example, ACD 101 may receive a performance indicator from WFM system 102 that is associated with agent 111. This performance indicator may be based on one or more of a quality monitoring evaluation 140, customer feedback survey 141, and lesson assessment 142.

The first agent and the second agent are ranked in a queue of available agents based on the first and second performance indicators (206). For example, ACD 101 may rank agent 110 and agent 111 in a queue of available agents based on the first and second performance indicators received from WFM 102. In an example, if agent 110 had a higher performance indicator than agent 111, then agent 110 would be ranked higher than agent 111 in the queue of available agents.

In an embodiment, the first agent and the second agent are ranked based on a score that is based on one or more of a quality monitoring evaluation, customer feedback survey, lesson assessment, and the idle times for the first and second agents. This score may be calculated as a weighted sum of one or more of a quality monitoring evaluation score, customer feedback survey score, lesson assessment score, and an idle time for the first or second agent.

An incoming call is received that is directed to the queue of available agents (208). For example, a call from caller 115 may be received by ACD 101 via telephone 135 and network 103.

An agent is selected to service the incoming call based on the queue rank (210). For example, agent 110 may be selected by ACD 101 over agent 111 to service the incoming call from caller 115 based on the fact that agent 110 has a higher queue rank than agent 111.

Figure 3:
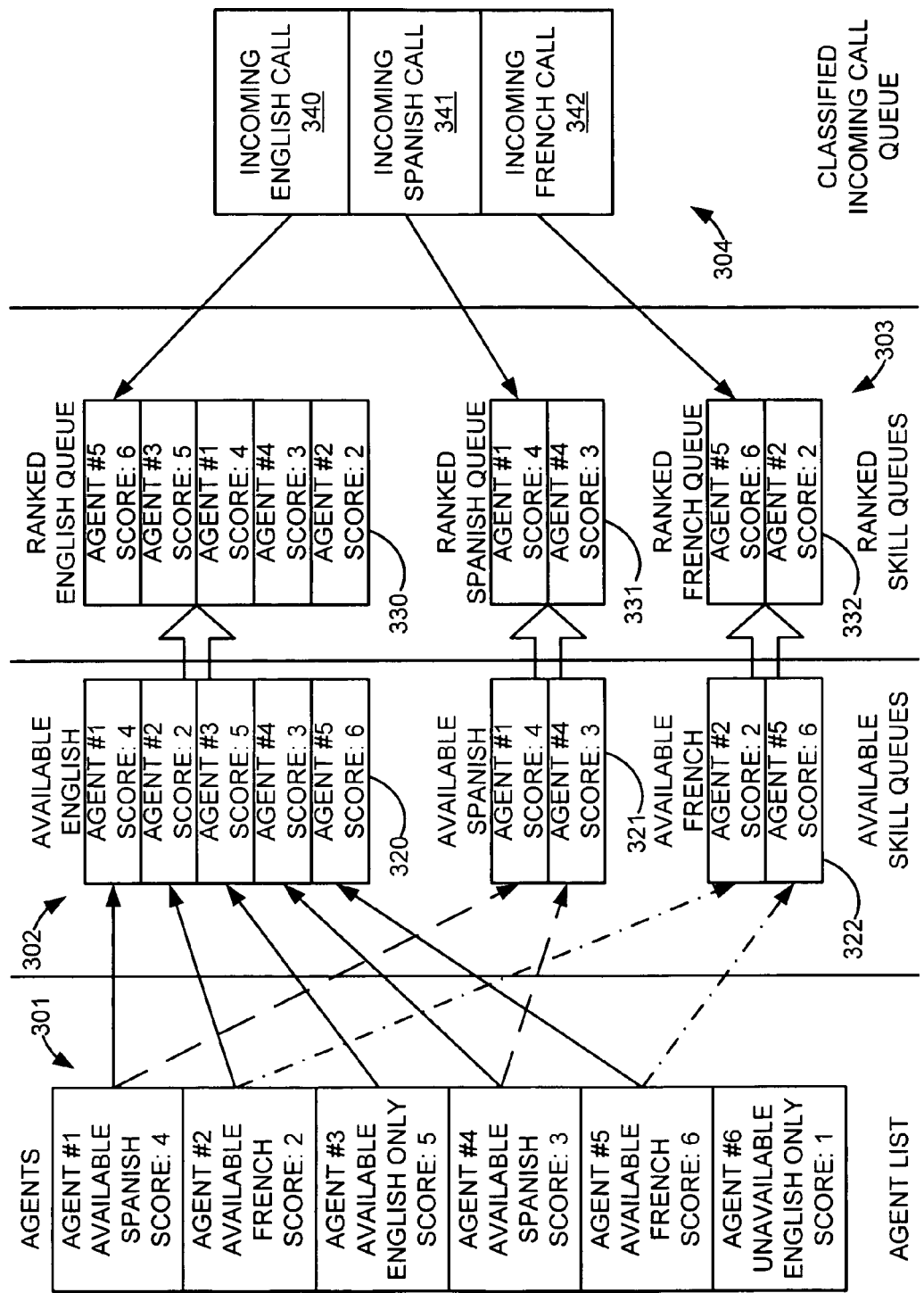
FIG. 3 is a diagram illustrating available agent ranking.

FIG. 3 is a diagram illustrating available agent ranking. In FIG. 3, an agent list 301 shows all of the agents number 1 through 6. Each agent has an availability, a skill, and a score. Agent #1 is available, speaks Spanish in addition to English, and has a performance indicator score of 4. Agent #2 is available, speaks French in addition to English, and has a performance indicator score of 2. Agent #3 is available, speaks only English, and has a performance indicator score of 5. Agent #4 is available, speaks Spanish in addition to English, and has a performance indicator score of 3. Agent #5 is available, speaks French in addition to English, and has a performance indicator score of 6. Agent #6 is unavailable, speaks only English, and has a performance indicator score of 1.

The available agents are classified into available skill queues 302. In other words, the available agents are grouped or listed by their skills Agent #6 is not classified because agent #6 is not available. In FIG. 3, there are three available skill queues: available English 320, available Spanish 321, and available French 322. Agents 1-5 are classified into the available English skill queue 320 because they all speak English and are available. Agents 1 and 4 are also classified into the available Spanish queue 321 because they speak Spanish in addition to English and are available (i.e., they are available to speak to Spanish speaking callers). Agents 2 and 5 are classified into the available French queue 322 because they speak French in addition to English and are available (i.e., they are available to speak to French speaking callers).

The available skill queues 302 are ordered into ranked skill queues 303. In FIG. 3, this ranking is based on the score associated with each agent in an available skill queue 302. The ranked English speaker queue 330 is shown in FIG. 3 in the following order from top to bottom: agent #5, agent #3, agent #1, agent #4, and agent #2. They are ranked in this order because agents 5, 3, 1, 4, and 2 have the performance indicator scores of 6, 5, 4, 3, and 2, respectively. The ranked Spanish speaker queue 331 is shown if FIG. 3 with agent #1 ranked above agent #4. This is because agent #1 had a performance indicator score of 4 and agent #4 had a performance indicator score of 3. The ranked French speaker queue 332 is shown if FIG. 3 with agent #5 ranked above agent #2. This is because agent #5 had a performance indicator score of 6 and agent #2 had a performance indicator score of 2.

FIG. 3 also shows a classified incoming call queue 304. The classified incoming call queue 304 has calls that are in the ordered they were received and have been classified by a necessary skill FIG. 3 shows a classified incoming call queue with an incoming English language call 340, an incoming Spanish language call 341, and an incoming French language call 342.

FIG. 3 shows an arrow from the incoming English language call 340 to agent #5 in the ranked English speaker queue 330. This is to illustrate that the incoming English language call 340 is assigned to the highest ranked agent (in this case, agent #5) in the ranked English speaking agent queue 330. FIG. 3 shows an arrow from the incoming Spanish language call 341 to agent #1 in the ranked Spanish speaker queue 331. This is to illustrate that the incoming Spanish language call 341 is assigned to the highest ranked agent (in this case, agent #1) in the ranked Spanish speaker queue 331. FIG. 3 shows an arrow from the incoming French language call 342 to agent #5 in the ranked French speaker queue 332. This is to illustrate that the incoming French language call 342 is assigned to the highest ranked agent (in this case, agent #5) in the ranked French speaker queue 332.

Figure 4:
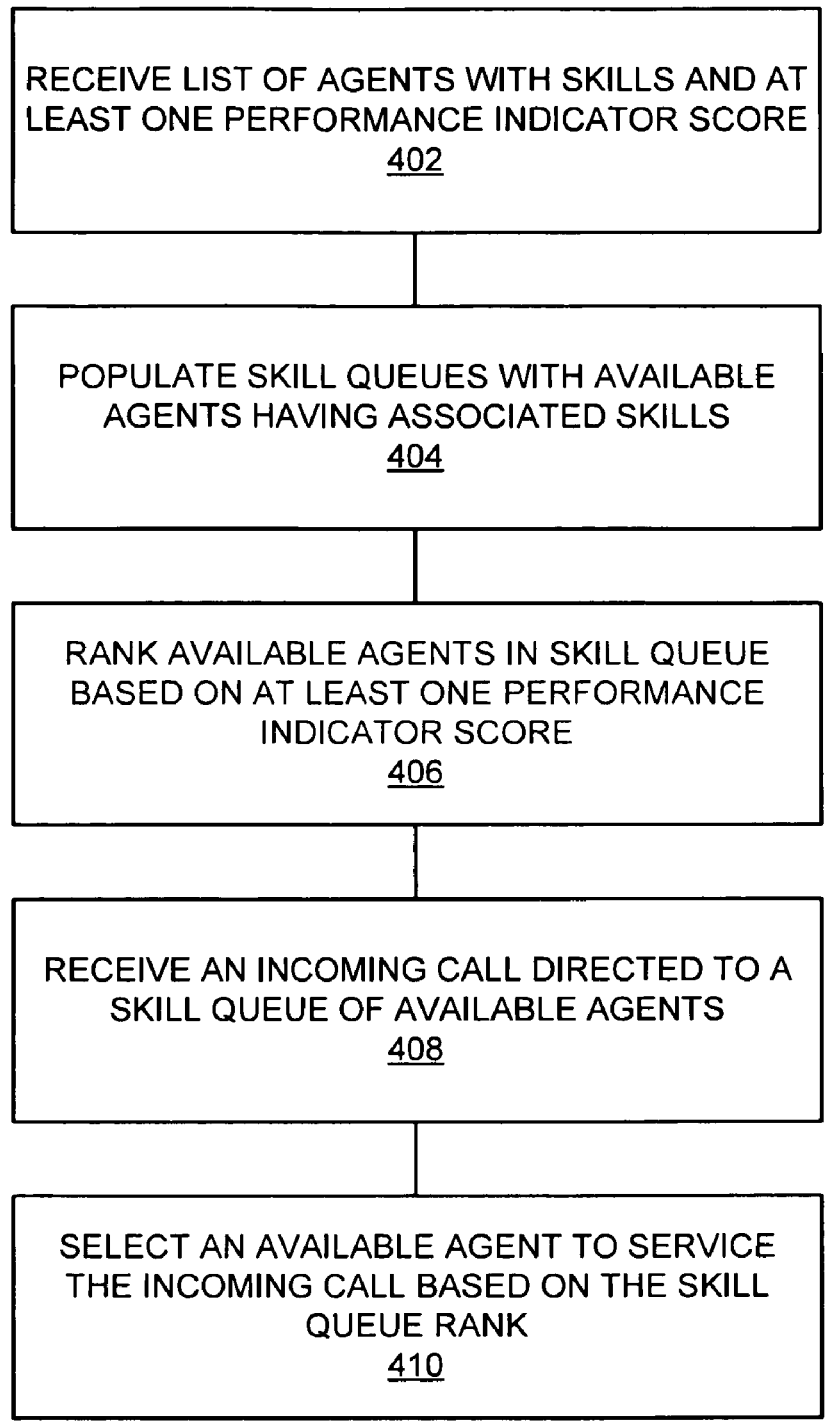
FIG. 4 is a flowchart illustrating a method of assigning calls to agents; and, FIG. 5 is a block diagram of a computer system.

FIG. 4 is a flowchart illustrating a method of assigning calls to agents. The steps illustrated in FIG. 4 may be performed by one or more elements of call distributing system 100.

A list of agents with skills and at least one performance indicator score is received (402). This list may be, for example, illustrated by agent list 301 shown in FIG. 3. Skill queues are populated with available agents having the associated skills (404). These skill queues may be, for example, illustrated by the available skill queues 302 shown in FIG. 3.

The available agents in an available skill queue are ranked based on at least a performance indicator score (406). This ranking may be, for example, illustrated by the ranked skill queues 303 shown in FIG. 3. An incoming call directed to a skill queue of available agents is received (408). This may be illustrated, for example, by the first incoming English language call 340 shown in FIG. 3.

An available agent is selected to service the incoming call based on the skill queue rank (410). This may be illustrated, for example, by the arrow from the incoming English language call 340 to agent #5 in the ranked English speaker queue 330 in FIG. 3. In another example, this may be illustrated by the arrow from the incoming Spanish language call 341 to agent #1 in the ranked Spanish speaker queue 331.

The methods, systems, networks, telephones, and distributors described above may be implemented with, contain, or be executed by one or more computer systems. The methods described above may also be stored on a computer readable medium. Many of the elements of call distributing system 100 may be, comprise, or include computers systems. This includes, but is not limited to: ACD 101; WFM system 102; network 103; agent telephones 130-132; and, caller telephones 135-137.

Figure 5:
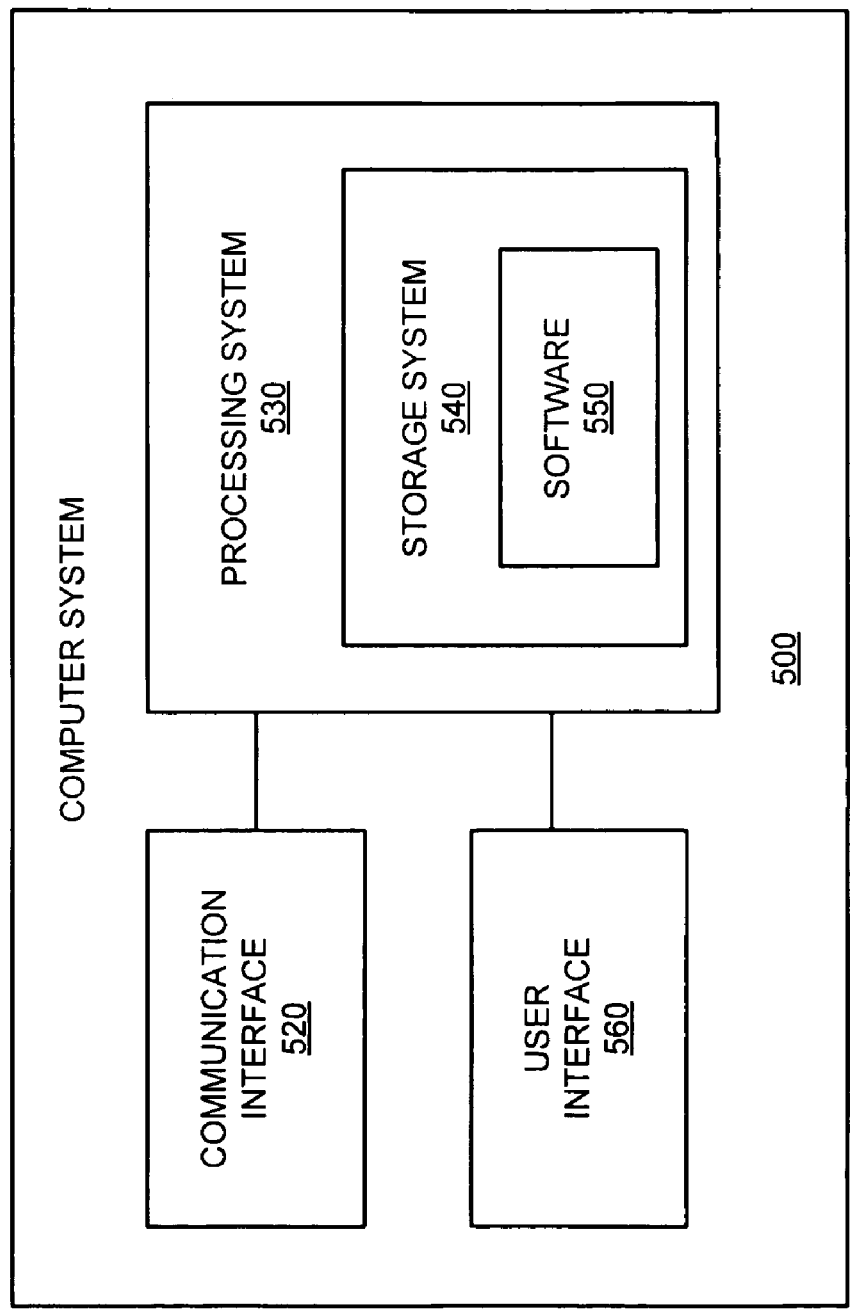

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of assigning calls to agents, comprising:
providing a skill queue for each possible agent skill;
for each of the agents, receiving a performance indicator for each skill associated with the agent from a workforce management system;
for each of the agents, receiving an availability of the agent from the workforce management system;
for each available one of the agents, classifying the available agent with a skill queue corresponding with each skill associated with the available agent, wherein at least one available agent is classified with multiple skill queues simultaneously;
for each skill queue, ranking the available agents classified with the skill queue based upon at least the performance indicators for the available agents for the skill corresponding with the skill queue;
receiving an incoming call directed to one of the skill queues based on a characteristic of the incoming call; and
selecting one of the available agents classified with the one of the skill queues to service the incoming call based upon the ranking of the available agents classified with the one of the skill queues.

2. The method of claim 1, wherein the performance indicators are based on quality monitoring evaluation scores.

3. The method of claim 1, wherein the performance indicators are based on customer feedback surveys.

4. The method of claim 1, wherein the performance indicators are based on lesson assessments.

5. The method of claim 1, wherein the performance indicators are based on weighted sums comprising at least two of a quality monitoring evaluation score, a customer survey feedback score, and a lesson assessment score.

6. The method of claim 1, wherein the ranking of the available agents classified with the skill queue is also based on an idle time of each of the available agents classified with the skill queue.

7. The method of claim 1, wherein the performance indicators are based on weighted sums comprising at least two of a quality monitoring evaluation score, a customer survey feedback score, a lesson assessment score, and an idle time.

8. A call distribution system, comprising:
- a workforce management system interface configured to receive a performance indicator associated with each skill possessed by each agent of a plurality of agents, and to receive an availability of each agent of the plurality of agents;
- a memory device configured to store multiple agent priority lists concurrently, wherein each of the agent priority lists corresponds to a possible skill, wherein each of the agent priority lists comprises a ranking of each of the available agents associated with the skill corresponding with the agent priority list based upon at least the performance indicator associated with each of the available agents with respect to the skill corresponding with the agent priority list, wherein at least two of the agent priority lists are associated with the same available agent; and
- a call distributor configured to direct an incoming call to one of the agent priority lists based on a characteristic of the incoming call, and to select one of the available agents associated with the one of the agent priority lists to service the incoming call based on the ranking of the available agents associated with the one of the agent priority lists.

9. The call distribution system of claim 8, wherein the performance indicators are based on quality monitoring evaluation scores.

10. The call distribution system of claim 8, wherein the performance indicators are based on customer feedback surveys.

11. The call distribution system of claim 8, wherein the performance indicators are based on lesson assessments.

12. The call distribution system of claim 8, wherein the performance indicators are based on weighted sums comprising at least two of a quality monitoring evaluation score, a customer survey feedback score, and a lesson assessment score.

13. The call distribution system of claim 8, wherein the agent priority of each of the available agents is also based on an idle time of the each of the available agents.

14. The call distribution system of claim 8, wherein the performance indicators are based on weighted sums comprising at least two of a quality monitoring evaluation score, a customer survey feedback score, a lesson assessment score, and an idle time.

15. A program storage device readable by a machine, tangibly embodying a program of instructions executable by the machine to perform method steps for assigning calls to agents, the method comprising:
- providing a skill queue for each possible agent skill;
- for each of the agents, receiving a performance indicator for each skill associated with the agent from a workforce management system;
- for each of the agents, receiving an availability of the agent from the workforce management system;
- for each available one of the agents, classifying the available agent with a skill queue corresponding with each skill associated with the available agent, wherein at least one available agent is classified with multiple skill queues simultaneously;
- for each skill queue, ranking the available agents classified with the skill queue based upon at least the performance indicators for the available agents for the skill corresponding with the skill queue
- receiving an incoming call directed to one of the skill queues based on a characteristic of the incoming call; and
- selecting one of the available agents classified with the one of the skill queues to service the incoming call based upon the ranking of the available agents classified with the one of the skill queues.

16. The program storage device of claim 15, wherein the performance indicators are based on quality monitoring evaluation scores.

17. The program storage device of claim 15, wherein the performance indicators are based on customer feedback surveys.

18. The program storage device of claim 15, wherein the performance indicators are based on lesson assessments.

19. The program storage device of claim 15, wherein the performance indicators are based on weighted sums comprising at least two of a quality monitoring evaluation score, a customer survey feedback score, and a lesson assessment score.

20. The program storage device of claim 15, wherein the performance indicators are based on weighted sums comprising at least two of a quality monitoring evaluation score, a customer survey feedback score, a lesson assessment score, and an idle time.

* * * * *